United States Patent [19]

Hay

[11] Patent Number: 4,840,647
[45] Date of Patent: Jun. 20, 1989

[54] PROCESS FOR TREATING A GASEOUS MIXTURE BY ADSORPTION

[75] Inventor: Léon Hay, Paris, France

[73] Assignee: L'air Liquide, Societe Anonyme pour l'Etude et l'Exploitation des Procedes Georges Claude, Paris, France

[21] Appl. No.: 267,636

[22] Filed: Oct. 21, 1988

Related U.S. Application Data

[63] Continuation of Ser. No. 22,450, filed as PCT FR86/00240 on Jul. 4, 1986, published as WO87/00076 on Jan. 15, 1987, abandoned.

[30] Foreign Application Priority Data

Jul. 4, 1986 [FR] France .................. 8510405

[51] Int. Cl.$^4$ ............................................. B01D 53/04
[52] U.S. Cl. .......................................... 55/26; 55/58; 55/62; 55/68; 55/74
[58] Field of Search ............... 55/25, 26, 58, 62, 68, 55/74, 75

[56] References Cited

U.S. PATENT DOCUMENTS

| | | | |
|---|---|---|---|
| 3,085,379 | 4/1963 | Kiyonaga et al. | 55/58 X |
| 3,176,444 | 4/1965 | Kiyonaga | 55/58 X |
| 3,338,030 | 8/1967 | Feldbauer, Jr. | 55/25 |
| 3,430,418 | 3/1969 | Wagner | 55/25 |
| 3,564,816 | 2/1971 | Batta | 55/26 |
| 3,636,679 | 1/1972 | Batta | 55/26 |
| 3,638,398 | 2/1972 | Domine et al. | 55/25 |
| 3,738,087 | 6/1973 | McCombs | 55/58 |
| 3,751,878 | 8/1973 | Collins | 55/58 |
| 3,788,037 | 1/1974 | Shell et al. | 55/58 |
| 4,077,779 | 3/1978 | Sircar et al. | 55/25 |
| 4,512,779 | 4/1985 | Hay | 55/26 |
| 4,512,780 | 4/1985 | Fuderer | 55/26 |
| 4,578,089 | 3/1986 | Richter et al. | 55/58 X |
| 4,581,044 | 4/1986 | Uno et al. | 55/25 |

FOREIGN PATENT DOCUMENTS

| | | |
|---|---|---|
| 0083832 | 7/1983 | European Pat. Off. . |
| 0108005 | 5/1984 | European Pat. Off. . |
| 2270927 | 12/1975 | France . |

Primary Examiner—Robert Spitzer
Attorney, Agent, or Firm—Young & Thompson

[57] ABSTRACT

The adsorption cycle comprises the following stages:

(a) an isobaric adsorption stage at a high pressure of the cycle in which the mixture to be treated is admitted into the adsorber through a first end, termed inlet end, of the adsorber, circulates through the adsorber and is withdrawn therefrom by its other end, termed outlet end, the direction of circulation of the mixture being termed cocurrent;

(b) a first stage for the cocurrent decompression of the adsorber to a medium pressure of the cycle;

(c) a second stage for the countercurrent decompression of the adsorber to a low pressure of the cycle, the gas withdrawn in the course of this stage being the production gas, and (d) a stage for raising the pressure of the adsorber to the high pressure of the cycle.

Application in the recovery of carbon dioxide from sources which contain only 10 to 30% thereof.

26 Claims, 6 Drawing Sheets

PROCESS FOR TREATING A GASEOUS MIXTURE BY ADSORPTION

This application is a continuation of application Ser. No. 022,450, filed as PCT FR86/00240 on Jul. 4, 1986, published as WO87/00076 on Jan. 15, 1987, now abandoned.

The present invention relates to a process for recovering by adsorption at least one preferentially adsorbable constituent of a gaseous mixture. It in particular applies to the production of mixtures having at least 95% $CO_2$ (carbon dioxide) from gaseous mixtures which contain only about 10 to 30% of $CO_2$.

An object of the invention is to extract the $CO_2$ from poor sources such as smoke gases of cement factories or boilers, discharge gases, iron works gases coming from direct reducing processes or biogases, with a good extracting yield and a low consumption of energy. For this purpose, the invention provides a process for recovering by adsorption at least one preferentially adsorbable constituents of a gaseous mixture, this process employing at least one adsorber and being characterized by the following cycle of operations:

(a) an isobaric adsorption stage at a high pressure of the cycle in which the mixture to be treated is admitted into the adsorber through a first end, termed inlet end, of the adsorber, circulates through the latter and is withdrawn therefrom through its other end, termed outlet end, the direction of circulation of the mixture being termed cocurrent;

(b) a first, cocurrent decompression stage of the adsorber to a medium pressure of the cycle;

(c) a second, countercurrent decompression stage of the adsorber to a low pressure of the cycle, the gas withdrawn in the course of this stage being the production gas, and (d) a stage for raising the pressure of the adsorber up to the high pressure of the cycle.

Several examples of carrying out the invention will now be described with reference to the accompanying drawings, in which.

In all the examples described hereinafter, it will be assumed that a gaseous mixture available at around atmospheric pressure is treated. For reasons of economy, it is treated by adsorption at a pressure only slightly higher than atmospheric pressure by using a blower or a fan for its circulation. Thus, the cycle evolves between a high pressure slightly higher than atmospheric pressure and a low pressure constituting a relative vacuum, for example on the order of 0.1 bar.

The treated gas contains 10 to 30% $CO_2$ and 70 to 90% various constituents ($N_2$, $O_2$, CO, ...). The adsorbent used is an active charcoal whose property is to adsorb $CO_2$ preferentially relative to the other principal constituents of the mixture.

Plotted on each of the diagrams of FIGS. 1, 3, 5 to 7, 9 and 11, is the time t as abscissae and the pressure P (in absolute bars) as ordinates. If the process uses n adsorbers (n=2, 3 or 4), these adsorbers are number 1 to n, and the curve represents the variation of the pressure in the adsorber 1 in the course of a complete cycle of duration T. This period is divided into n subperiods of duration $T/n$, and the operation of the adsorber i is deduced from that represented by shifting the curve to the right of $(i-1) \times T/n$. In the illustrated examples, the duration of the cycles is for example on the order of n x a few minutes.

In the aforementioned diagrams, the lines oriented by arrows indicate the movements and destinations of the gaseous currents; when the arrows are parallel to the axis of the ordinates, they also indicate the direction of circulation in an adsorber; when an arrow is in the direction of increasing ordinates (upwardly in the diagram), the current is said to be cocurrent in the adsorber; if the downwardly directed arrow is located below the line indicating the pressure in the absorber, the current enters the adsorber through the inlet end of the adsorber; if the upwardly directed arrow is located above the line indicating the pressure, the current issues from the adsorber through the outlet end thereof, the inlet and outlet ends being respectively those of the gas to be treated and of the gas withdrawn in isobaric adsorption stage; when an arrow is in the direction of decreasing ordinates (toward the bottom of the diagram), the current is said to be countercuurent in the adsorber. If the downwardly directed arrow is located below the line indicating the pressure of the adsorber, the current issues from the adsorber through the inlet end thereof, if the downwardly directed arrow is located above the line indicating the pressure, the current enters the adsorber through the outlet end thereof, the inlet and outlet ends still being those of the gas to be treated and of the gas withdrawn in the isobaric adsorption stage. Further, there have been indicated in full lines the gaseous currents which exclusively concern the adsorber 1 and in dotted lines the gaseous currents from or in the direction of other adsorbers whose numbers are indicated in the diagram.

Figure 1:
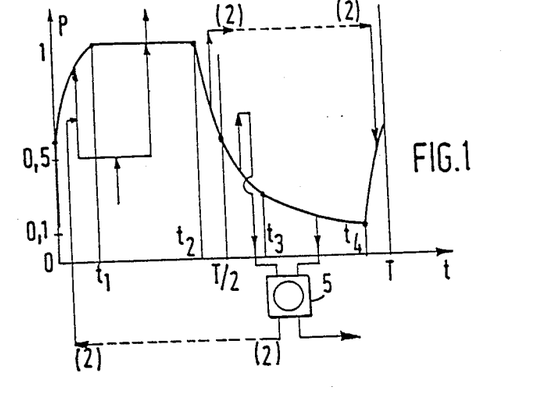
FIG. 1 is a diagram illustrating a process according to the invention using two adsorbers.

Thus, in FIG. 1, which illustrates a process using two adsorbers 1 and 2, the cycle comprises, for the adsorber 1:

from $t=0$ to $t_1$, a final step of rise in pressure from about 0.6 bar to about 1 bar;

from $t_1$ to $t_2$, a cocurrent isobaric adsorption stage;

from $t_2$ to $T/2$, a first step for achieving a depression by balancing with the adsorber 2;

from $T/2$ to $t_3$, a second step for achieving a depression by a cocurrent pumping with a vacuum pump 5 to an intermediate pressure on the order of 0.3 bar;

from $t_3$ to $t_4$, a third step for producing depression by countercurrent pumping with the same pump 5 to the low pressure of the cycle, on the order of 0.1 bar, and a first step for raising pressure up to about 0.6 bar, by balancing with the adsorber 2, which imposes the equation:

$$T - t_4 = T/2 - t_2$$

As concerns the gaseous flows:

from $t=0$ to $t_2$, some mixture to be treated is admitted into the adsorber 1;

from $t=0$ to $t_1$, the gas pumped in the course of the cocurrent pumping of the adsorber 2 is recycled and added to the mixture to be treated, either directly from the outlet of the vacuum pump 5 if the outlet pressure of this pump is suitable, or by returning this gas to the inlet of the blower. The equation $t_3-T/2=t_1$ is checked;

from $t=0$ to $t_1$, no gaseous flow issues from the adsorber 1. On the other hand, from $t_1$ to $t_2$, a residual gas, poorer in $CO_2$, is withdarwn through the outlet end of the adsorber 1 and released to the air, while this adsorber is charged preferentially with $CO_2$; in other words, in the course of this adsorption stage, the $CO_2$ is stopped on the adsorbent and its concentration in the coadsorbed state with the other constituents of the mixture is higher than its content in the initial mixture;

from $t_2$ to $T/2$, the adsorber 1 is decompressed in the cocurrent manner so that there are preferentially eliminated the constituents other than the $CO_2$, less adsorbed than the latter, present in the adsorber at the end of adsorption under a partial pressure higher than that of the $CO_2$. This fraction poor in $CO_2$ is used for partially repressurizing in a countercurrent manner the other adsorber in the low pressure state (pressure balancing stage);

from $T/2$ to $t_3$, the cocurrent pumping has for effect, as the preceding balancing stage, of still further increasing the concentration of $CO_2$ of the adsorber by purging it of the other constituents;

from $t_3$ to $t_4$, the countercurrent pumping provides a gas whose mean content of $CO_2$ is equal to at least 95%.

It can be seen that, according to this process, the pumping of the adsorber is carried out in two stages providing two separate functions, the first obtained by a cocurrent circulation for extracting a fraction enriched with $CO_2$ but insufficiently concentrated, the second being effected in a countercurrent manner so as to extract the fraction having the desired content of $CO_2$ and ensuring the production.

Tests comprising a first pumping to 0.55 bar and a second pumping to 0.15 bar have provided, without recycling of the first pumped fraction, a first enriched fraction having about 30% $CO_2$, and a second fraction having about 95% $CO_2$, with an extraction yield for this second fraction of 66%. The fact that the first fraction is richer in $CO_2$ than the initial mixture explains the interest of the recycling of this fraction to the inlet of the other adsorber, which still further improves the extraction yield of $CO_2$.

Figure 2:
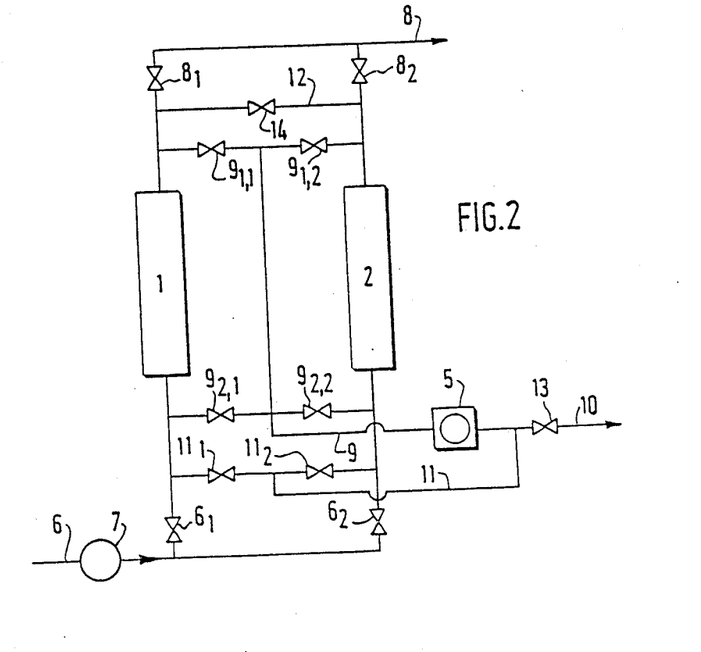
FIG. 2 shows diagrammatically a plant for carrying out this process.

The plant shown in FIG. 2 enables the process of FIG. 1 to be carried out. It comprises, in addition to the adsorbers 1 and 2 and the pump 5, an inlet line 6 for the mixture to be treated, provided with a blower or a fan 7, a line 8 for putting the residual gas in communication with the air, a pumping line 9 connected to the inlet of the pump 5, a production line 10 and a recycling line 11 connected to the outlet of this pump, and a balancing line 12.

The line 6 is connected to the inlet of the adsorbers 1 and 2 through respective valves $6_1$ and $6_2$, the line 8 to their outlets through valves $8_1$ and $8_2$, the line 9 to the same outlets through valves $9_{1,1}$ and $9_{1,2}$ and to the inlets of the adsorbers through valves $9_{2,1}$ and $9_{2,2}$; the line 11 is connected to the inlets of the adsorbers through valves $11_1$ and $11_2$, the production line 10 includes a valve 13 and the balancing line interconnects the outlets of the two adsorbers and includes a valve 14. It will be easily understood how it is possible to obtain the cycle illustrated in FIG. 1 by means of the various valves.

Figure 3:
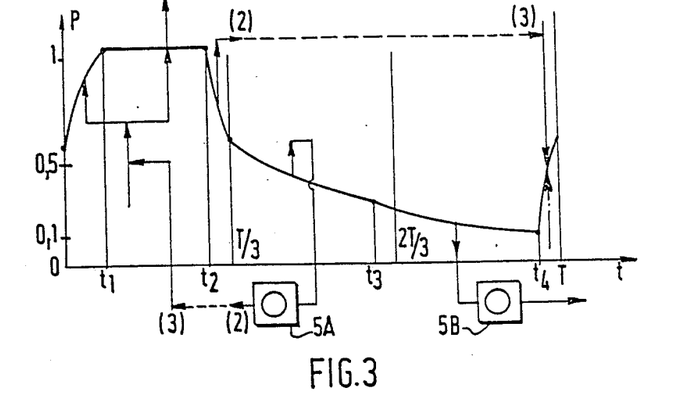
FIG. 3 is a diagram illustrating a process according to the invention using three adsorbers.

FIG. 3 illustrates a process which uses three adsorbers 1 to 3 each of which undergoes, as before and cyclically, the stages of isobaric adsorption under a pressure of about 1 bar, of first decompression by balancing, of first cocurrent pumping with recycling of the pumped gas, of second countercurrent pumping delivering the production gas, and of pressure raising first by balancing then by the admission of the mixture to be treated. However, in this case, two vacuum pumps 5A and 5B ae used, each one being allocated to one of the two pumping operations. More precisely, and considering the adsorber 1:

from $t=0$ to $t_1$, the mixture to be treated, to which is added the first pumped fraction coming from the adsorber 3, penetrates through the inlet of the adsorber 1 so as to bring it from about 0.6 to about 1 bar;

from $t_1$ to $t_2$, the same gas circulates in a cocurrent manner through the adsorber and the residual gas is put in communication with the air;

from $t_2$ to $T/2$, first cocurrent decompression by balancing to about 0.6 bar, the discharged gas being sent in a countercurrent manner to the adsorber 2 which is in the low pressure state;

from $T/3$ to $t_3$ ($t_3<2T/3$), first cocurrent pumping by the pump 5A to about 0.3 bar, the pumped gas being recycled to the inlet of the adsorber 2;

from $t_3$ to $t_4$, second countercurrent pumping by the pump 5B to about 0.1 bar so as to deliver the production gas, and from $t_4$ to $T$, first rise in pressure up to 0.6 bar by balancing with the adsorber 3, the gas being introduced in a countercurrent manner into the adsorber 1.

The following equations are checked:

$$T/3-t_2=T-t_4;$$

$$t_3-t_2=t_4-t_3=T/3.$$

Thus, the pump 5B operates continuously, which is an advantage from the energetic point of view, and the recycling of the first pumped fraction is effected throughout the adsorption stage. If, moreover, as indicated in dot-dash lines in FIG. 3, the mixture to be treated is admixed in a cocurrent manner into the adsorber 1 also during the first pressure raising stage (from $t_4$ to $T$), the blower also operates continuously.

Figure 4:
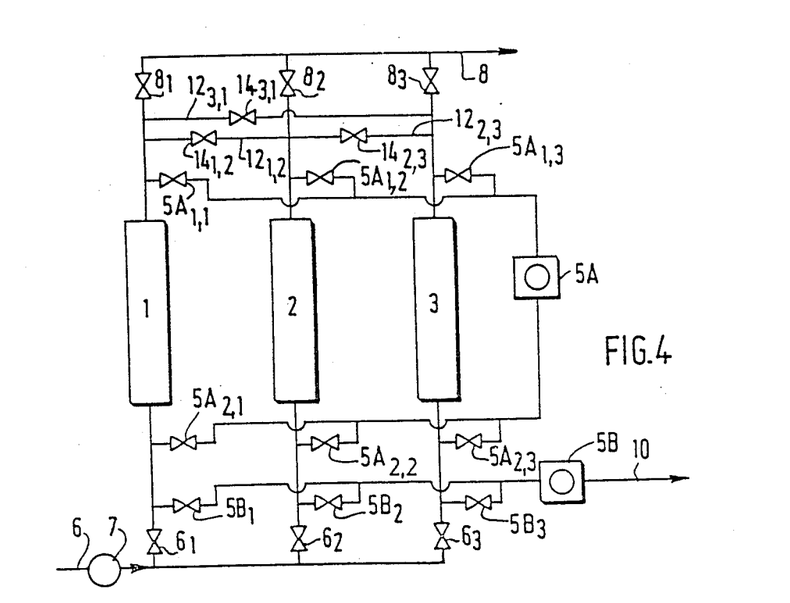
FIG. 4 shows diagrammatically a plant for carrying out the process of FIG. 3.

The plant of FIG. 4 enables the cycle of FIG. 3 to be carried out. With notations similar to those of FIG. 2:

line 6 is connected to the inlet of the adsorbers through valves $6_1$, $6_2$, $6_3$ respectively, and the line 8 is connected to their outlets through valves $8_1$, $8_2$, $8_3$;

the inlet of the pump 5A is connected to the outlet of the adsorbers through valves $5A_{1,1}$, $5A_{1,2}$, $5A_{1,3}$, and its outlet is connected to the inlet of the adsorbers through valves $5A_{2,1}$, $5A_{2,2}$, $5A_{2,3}$;

the inlet of the pump 5B is connected to the inlet of the adsorbers through valves $5B_1$, $5B_2$, $5B_3$;

three balancing lines $12_{1,2}$, $12_{2,3}$, $12_{3,1}$ are provided with respective lines $14_{1,2}$, $14_{2,3}$, $14_{3,1}$.

Note that, since the pump 5B operates continuously, no valve is provided in the production pipe 10.

Figure 5:
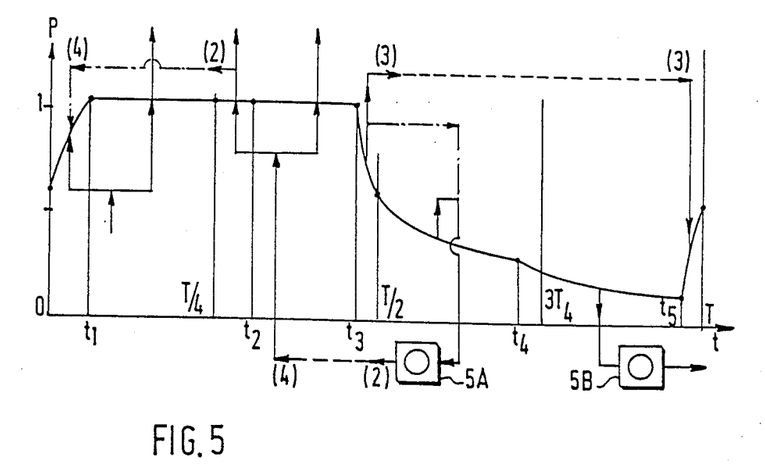
FIGS. 5 to 7, 9 and 11 are diagrams illustrating respectively five processes according to the invention using four adsorbers.

FIG. 5 illustrates a process using four adsorbers 1 to 4 each of which undergoes cyclically the same stage as before, with the use of wo vacuum pumps 5A and 5B.

More precisely, there occurs, considering the adsorber 1:

from $t=0$ to $t_1$: end of the pressure rise from about 0.6 bar to about 1 bar, by the admission of the mixture to be treated through the inlet of the adsorber;

from $t_1$ to T/4: isobaric adsorption stage with a cocurrent circulation of the mixture and the putting of the residual gas in communication with the air;

from T/4 to $t_3 < T/2$: cocurrent circulation of the first fraction pumped in the adsorber 4 and recycled;

from $t_3$ to T/2: first cocurrent decompression by balancing to about 0.6 bar, the gas issuing from the outlet of the adsorber 1 being introduced into the adsorber 3 in a countercurrent manner;

from T/2 to $t_4 < 3T/4$: first cocurrent pumping to about 0.3 bar, the pumped fraction being recycled to the inlet of the adsorber 2;

from $t_4$ to $t_5$: second countercurrent pumping to about 0.1 bar and delivery of the production gas;

from $t_5$ to T: first rise in pressure to about 0.6 bar by a countercurrent balancing with the gas coming from the adsorber 3.

The following equations are checked:

$$T - t_5 = T/2 - t_3;$$

$$t_4 - t_3 = t_5 - t_4 = T/4.$$

Thus, in the process of FIG. 5, each adsorber first treats the mixture (from $t_1$ to T/4), then the whole of the recycled first fraction coming from another adsorber, which fraction is richer in $CO_2$ than the initial mixture.

FIG. 5 illustrates in dot-dash lines two possible variants of this cycle:

(a) from time $t=0$ to time $t_1$, i.e. during the second step of raising the pressure, the adsorber 1 in addition receives through its outlet in a countercurrent manner, residual gas issuing from the adsorber 4. Likewise, from time T/4 to time $t_2$ such that $t_2 - T/4 = t_1$, all or a part of the residual gas issuing from the outlet of the adsorber 1 is sent in a countercurrent manner to the adsorber 2. Thus, as each adsorber is fed from $t=0$ to $t_1$ both with the mixture to be treated and the residual gas, it is more rapidly returned to the high pressure of the cycle before the start of the adsorption stage;

(b) the balancing stage is accompanied by the start of the first cocurrent pumping step. This permits continuously operating not only the mixture-introducing blower and the pump 5B, but also the pump 5A, which is advantageous from the energetic point of view. In this case, the pressure drops more rapidly from $t_3$ to T/2 and the balanced pressure is lower than the aforementioned value 0.6 bar.

Figure 6:
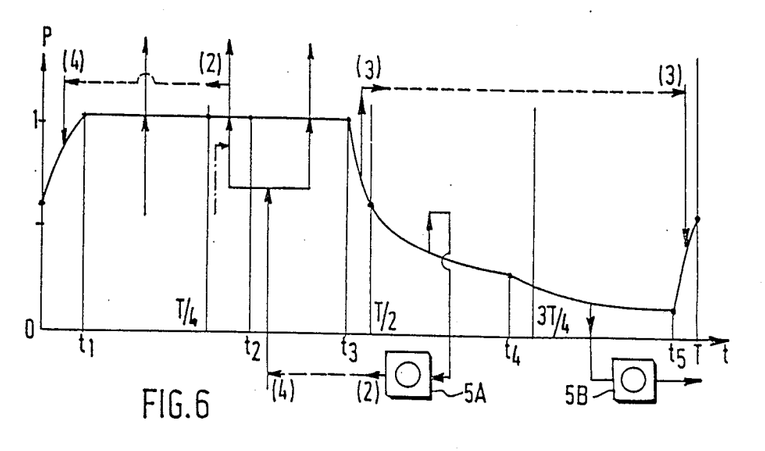

The cycle illustrated in FIG. 6 differs from the variant (a) of the cycle of FIG. 5 only in that the second pressure raising step is effected entirely by a countercurrent introduction, from $t=0$ to $t_1$, of the residual gas produced by the adsorber 4 from T/4 to $t_2$. Consequently, the introduction of the mixture to be treated is effected in an entirely isobaric manner at the high pressure of the cycle, solely during the adsorption stage of this mixture, namely from $t_1$ to T/4.

In this case, in order to once again ensure a continuous operation of the blower, the admission of the mixture may be continued to time $t_2$, as indicated in dot-dash lines in FIG. 6.

Figure 7:
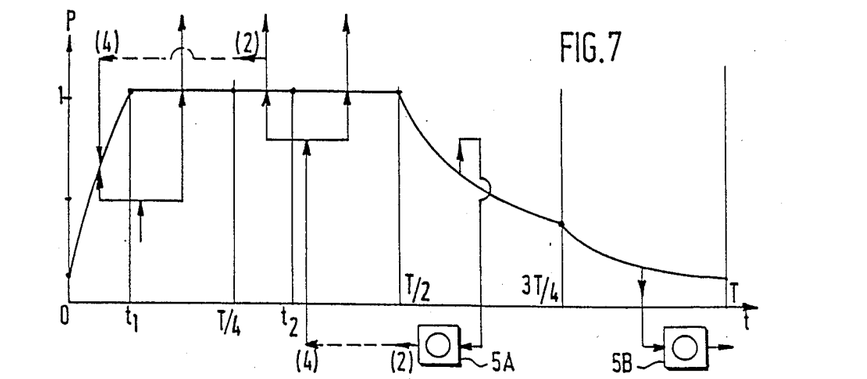

The cycle illustrated in FIG. 7 differs from the variant (a) of the cycle of FIG. 5 only by the elimination of the balancing stage, i.e. the isobaric adsorption of the first recycled fraction coming from the adsorber 4 is continued at the high pressure of the cycle from T/4 to T/2. Consequently, the whole of the rise in pressure from the low pressure to the high pressure of the cycle is effected by simultaneous introduction, on one hand, of the mixture to be treated through the inlet of the adsorber, and, on the other hand, of the residual gases coming from the adsorber 4 through the outlet of the absorber 1. The cocurrent pumping occurs from T/2 to 3T/4, and the countercurrent pumping from 3T/4 to T. This cycle enables the blower and the pumps 5A and 5B to be operated continuously.

Figure 8:
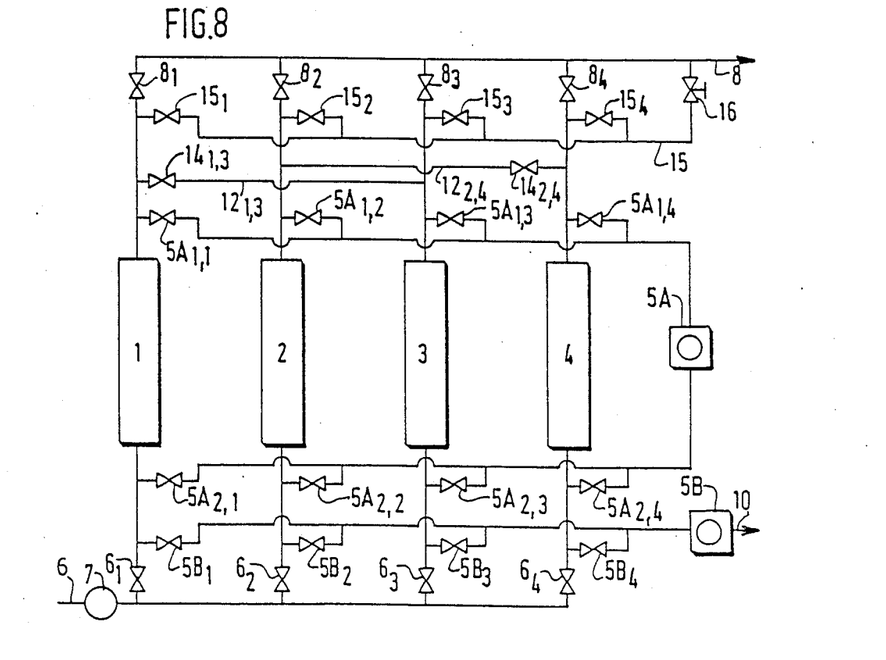
FIG. 8 shows diagrammatically a plant for carrying out the process of FIGS. 5 to 7.

The plant diagrammatically shown in FIG. 8 enables the cycles illustrated in FIGS. 5 to 7 to be carried out.

As concerns the cycle of FIG. 7, devoid of a balancing step and with notations similar to those of FIG. 4, there are shown the lines 6, 8, 10 and the pumps 5A and 5B with the same connections as before. The plant further comprises a line 15 provided with a flow controller element 16 which leads from the line 8 and enables the residual gas to be sent back, through respective valves $15_1$ to $15_4$, to the outlet of each adsorber 1 to 4 so as to raise the pressure.

The same plant may be used for carrying out the cycles of FIGS. 5 and 6 by adding thereto two balancing lines $12_{1,3}$ and $12_{2,4}$ provided with valves $14_{1,3}$ and $14_{2,4}$ connecting the outlets of the adsorbers 1 and 3 on one hand, and 2 and 4 on the other hand.

Figure 9:
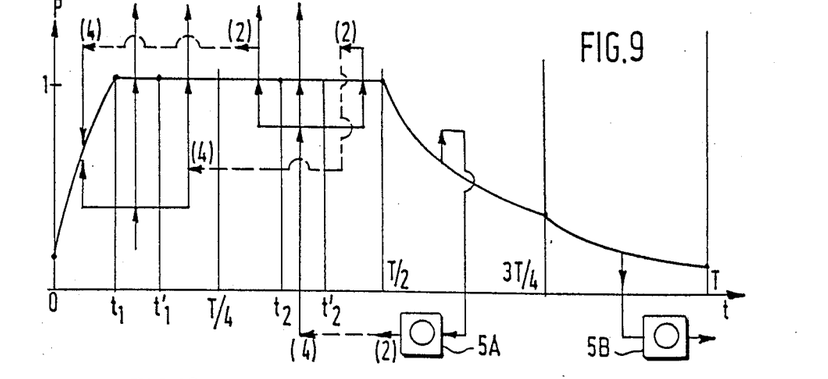

The cycle illustrated in FIG. 9 differs from that of FIG. 7 only in that, in a final step for the isobaric adsorption of the mixture to be treated (from $t_1'$ to T/4), there is added to this mixture, before its entry into the adsorber 1, residual gas (for example, as shown, the whole of this gas) coming from the adsorber 4, which is at the end of the adsorption of the first recycled fraction coming from the adsorbers 3 ($t_2'$ to T/2). Correspondingly, from $t_2'$ to T/2, the residual gas issuing from the adsorber 1 is recycled in a similar manner to the adsorber 2.

This second recycling is of interest when the content of $CO_2$ of the thus recycled gas is sufficiently high, namely higher than that of the mixture to be treated, which presupposes that the front of $CO_2$ is distinctly extracted from the adsorber toward the end of the isobaric stage, so as to preconcentrate the adsorber with $CO_2$ before its decompression.

By means of the two recycling employed, the quality of the production of $CO_2$, i.e. the content of $CO_2$ of the production gas, is improved while maintaining its extraction yield at a high level.

Figure 10:
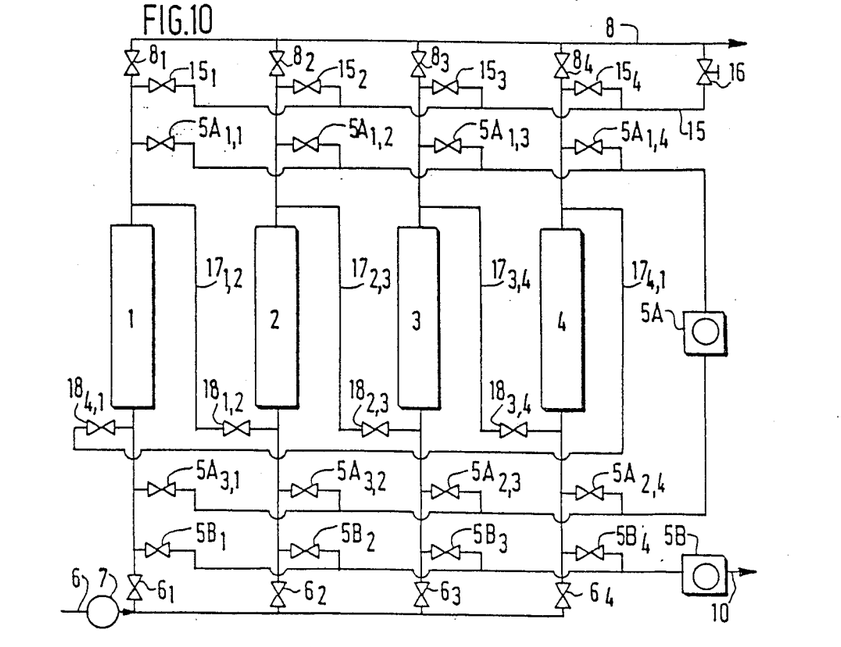
FIG. 10 shows diagrammatically a plant for carrying out the process of FIG. 9.

The plant diagrammatically shown in FIG. 10 permits carrying out the cycle of FIG. 9. It is similar to that of FIG. 8, without the balancing lines $12_{1,3}$ and $12_{2,4}$ but with in addition four second recycling pipes $17_{1,2}$, $17_{2,3}$, $17_{3,4}$, $17_{4,1}$ provided with respective valves $18_{1,2}$, $18_{2,3}$, $18_{3,4}$, $18_{4,1}$.

Figure 11:
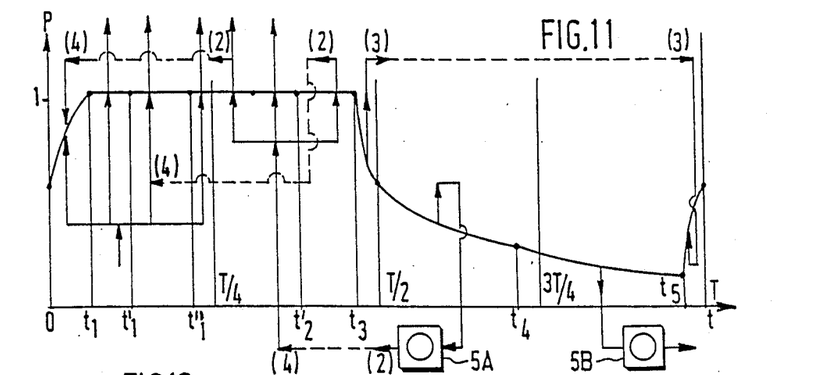

The two recyclings of FIG. 9 are again found in the cycle of FIG. 11, but within the framework of the process with balancing of the type of the variant (a) of FIG. 5. Owing to the first decompression by balancing from $t_3$ to T/2, the second recycling of the residual gas at the end of the isobaric stage, occurs, on the admission, between two instants $t_1'$ and $t_1''$ prior to T/4, with $T/4 - t_1'' = T/2 - t_3$ and $t_1'' - t_1' = t_3 - t_2'$.

It will be observed in FIG. 11, that, as the residual gas is, at the end of the isobaric stage, richer in $CO_2$ than the mixture to be treated, the decompression by balancing is carried out by sending the gas from the outlet of the adsorber 1 to the inlet of the absorber 3, in other words, the first rise in pressure by balancing, from $t_5$ to T, occurs by the introduction of gas in a cocurrent manner and not in a countercurrent manner, as in the previously-described cycles with balancing.

Figure 12:
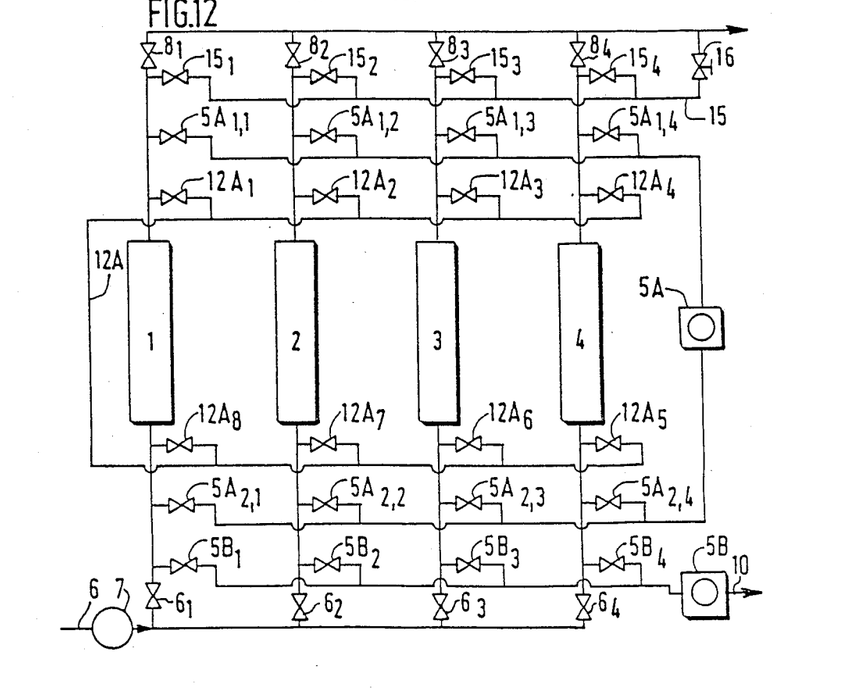
FIG. 12 shows diagrammatically a plant for carrying out the process of FIG. 11.

The plant diagrammatically shown in FIG. 12 enables the cycle of FIG. 11 to be carried out. It differs from the plant of FIG. 8 only in that the balancing lines $12_{1,3}$ and $12_{2,4}$ of the latter are replaced by a single line 12A which enable, owing to the eight valves $12A_1$ to $12A_8$, the inlet or the outlet of any adsorber to be put in communication with the inlet or the outlet of any other adsorber. By suitably acting on the valves, it will be understood that it is thus possible to effect the recyclings of residual gas and the balancings with cocurrent pressure raising described hereinbefore.

In its various forms described hereinbefore, the process according to the invention is particularly applicable to the recovery of $CO_2$ from poor sources, i.e. sources containing only about 10 to 30% $CO_2$. Generally, the process is applicable to the recovery of one or more of the most adsorbable constituents of a mixture, as, for example, the recovery of an active gas which is diluted in its utilization.

I claim:

1. A process for recovering by adsorption at least one preferentially adsorbable constituent of a gaseous feed mixture, said process employing only two adsorbers and comprising the following cycle of operations for each adsorber:
   (a) an adsorption stage in which the feed mixture is admitted into a first adsorber through an inlet end thereof and comprising an isobaric adsorption substage at a high pressure of the cycle for adsorption of said preferentially adsorbable constituent, the mixture, at least during said isobaric sub-stage, circulating through the first adsorber and being withdrawn therefrom through an outlet end thereof, the direction of circulation of the mixture being termed cocurrent, said isobaric sub-stage being conducted until an adsorption front has reached said outlet end;
   (b) a first stage for cocurrent decompression of the first absorber to a medium pressure of the cycle;
   (c) a second stage for countercurrent decompression of the first adsorber to a low pressure of the cycle, the gas withdrawn in the course of this second stage being the production gas containing the desired content of said adsorbable constituent, at least a portion of the gaseous mixture extracted from the first absorber in the course of stage (b) being richer in said adsorbable constituent than said gaseous feed mixture and being recycled to the inlet end of the second adsorber and admixed with said feed mixture during at least a portion of stage (a) of said second adsorber; and
   (d) a recompression stage to raise the pressure in said first adsorber from said low pressure to an initial pressure of said stage (a) by introduction of gas cocurrently withdrawn from the second adsorber.

2. A process according to claim 1, comprising, between stage (a) and stage (b), a step for balancing pressures in which the adsorber outlet end of said first adsorber is connected to an end of the second adsorber at the beginning of stage (d).

3. A process according to claim 2, wherein gas issuing from the first adsorber is admitted into the second adsorber in a countercurrent manner during the balancing stage.

4. A process according to claim 2, wherein gas issuing from the first adsorber is admitted into said second adsorber in a cocurrent manner during the balancing stage.

5. A process according to claim 2, wherein the mixture to be treated is introduced in a cocurrent manner into said second adsorber during the balancing step.

6. A process according to claim 2, wherein the stage (b) comprises a cocurrent pumping step, said medium pressure being lower than atmospheric pressure.

7. A process according to claim 6, wherein the pumping step is continued throughout the stage (b).

8. A process according to claim 1, characterized in that the high pressure of the cycle is slightly higher than atmospheric pressure.

9. A process according to claim 1, characterized in that the gaseous mixture is a gas containing 10 to 30% $CO_2$, the adsorbent employed being activated charcoal and the production gas having a content of at least about 95% $CO_2$.

10. A process for recovering by adsorption at least one preferentially adsorbable constituent of a gaseous feed mixture, said process employing only three adsorbers and comprising the following cycle of operations for each adsorber:
    (a) an adsorption stage in which the feed mixture is admitted into the adsorber through an inlet end thereof and comprising an isobaric adsorption substage at a high pressure of the cycle for absorption of said preferentially adsorbable constituent, the mixture, at least during said isobaric sub-stage, circulating through the adsorber and being withdrawn therefrom through an outlet end thereof, the direction of circulation of the mixture being termed cocurrent, said isobaric sub-stage being conducted until an adsorption front has reached said outlet end;
    (b) a first stage for cocurrent decompression of the adsorber to a medium presure of the cycle;
    (c) a second stage for countercurrent decompression of the adsorber to a low pressure of the cycle, the gas withdrawn in the course of this second stage being the production gas containing the desired content of said adsorbable constituent, at least a portion of the gaseous mixture extracted from the absorber in the course of stage (b) being richer in said adsorbable constituent than said gaseous feed mixture and being recycled to the inlet end of another adsorber and admixed with said feed mixture during at least one part of the stage (a) of said other absorber; and
    (d) a recompression stage to raise the pressure in said adsorber from said low pressure to an initial pressure of said stage (a) by introduction of gas cocurrently withdrawn from another adsorber.

11. A process according to claim 10, comprising, between stage (a) and stage (b), a step for balancing pressures in which the adsorber outlet end is connected to an end of another adsorber at the beginning of stage (d).

12. A process according to claim 10, wherein the mixture to be treated is introduced in a cocurrent manner into said other adsorber during the balancing step.

13. A process according to claim 10, wherein the stage (b) comprises a cocurrent pumping step, said medium pressure being lower than atmospheric pressure.

14. A process for recovering by adsorption at least one preferentially adsorbable constituent of a gaseous feed mixture, said process employing only four adsorbers and comprising the following cycle of operations for each adsorber:
   (a) an adsorption stage in which the feed mixture is admitted into the adsorber through an inlet end thereof and comprising an isobaric adsorption sub-stage at a high pressure of the cycle for adsorption of said preferentially adsorbable constituent, the mixture, at least during said isobaric sub-stage, circulating through the adsorber and being withdrawn therefrom through an outlet end thereof, the direction of circulation of the mixture being termed cocurrent, said isobaric sub-stage being conducted until an adsorption front has reached said outlet end;
   (b) a first stage for a cocurrent decompression of the adsorber to a medium pressure of the cycle;
   (c) a second stage for countercurrent decompression of the adsorber to a low pressure of the cycle, the gas withdrawn in the course of this second stage being the production gas containing the desired content of said adsorbable constituent, at least a portion of the gaseous mixture to be treated in said adsorption stage (a) being successively (i) said gaseous feed mixture, (ii) gas extracted from another adsorber in stage (b), mixed with said gaseous mixture, and (iii) gas extracted from said other adsorber in stage (b); and
   (d) a recompression stage to raise the pressure in said adsorber from said low pressure to an initial pressure of said stage (a) by introduction of gas cocurrently withdrawn from another adsorber.

15. A process according to claim 14, wherein stage (b) comprises an initial step for balancing pressures between a first adsorber subjected to said first sub-stage and another adsorber in stage (b), and said first sub-stage comprises said balancing step, then, solely, countercurrent admission into said first adsorber of gas issuing from still another adsorber in stage (a).

16. A process according to claim 14, characterized in that the high pressure of the cycle is slightly higher than atmospheric pressure.

17. A process according to claim 14, characterized in that the gaseous mixture is a gas containing 10 to 30% $CO_2$, the adsorbent employed being activated charcoal and the production gas having a content of at least about 95% $CO_2$.

18. A process for recovering by adsorption at least one preferentially adsorbable constituent of a gaseous feed mixture, said process employing a plurality of adsorbers and comprising the following cycle of operations for each adsorber:
   (a) an adsorption stage in which the feed mixture is admitted into the adsorber through an inlet end thereof and comprising an isobaric adsorption sub-stage at a high pressure of the cycle for adsorption of said preferentially adsorbable constituent, the mixture, at least during said isobaric sub-stage, circulating through the adsorber and being withdrawn therefrom through an outlet end thereof, the direction of circulation of the mixture being termed cocurrent, said isobaric sub-stage being conducted until an adsorption front has reached said outlet end;
   (b) a first stage for a cocurrent decompression of the adsorber to a medium pressure of the cycle;
   (c) a second stage for countercurrent decompression of the adsorber to a low pressure of the cycle, the gas withdrawn in the course of the second stage being the production gas containing the desired content of said adsorbable constituent, at least a portion of the gaseous mixture extracted from the adsorber in the course of stage (b) being richer iin said adsorbable constituent than said gaseous feed mixture and being recycled to the inlet end of another adsorber and admixed with said feed mixture during at least a portion of stage (a) of said other adsorber; and
   (d) a recompression stage to raise the pressure in said adsorber from said low pressure to an initial pressure of stage (a) by means of gas cocurrently withdrawn from another adsorber.

19. A process according to claim 18, comprising, between stage (a) and stage (b), a step for balancing pressures in which the adsorber outlet end of a first adsorber is connected to an end of another adsorber at the beginning of stage (d).

20. A process according to claim 19, wherein gas issuing from said first adsorber is admitted into said another adsorber in a countercurrent manner during the balancing stage.

21. A process according to claim 19, wherein gas issuing from said first adsorber is admitted into said another adsorber in a cocurrent manner.

22. A process according to claim 19, wherein the mixture to be treated is introduced into a cocurrent manner into said another adsorber during the balancing stage.

23. A process according to claim 19, wherein the stage (b) comprises a cocurrent pumping stage, said medium pressure being lower than atmospheric pressure.

24. A process according to claim 23, wherein the pumping step is continued throughout the stage (b).

25. A process according to claim 18, wherein the high pressure of the cycle is slightly higher than atmospheric pressure.

26. A process according to claim 18, wherein the gaseous mixture is a gas containing 10 to 30% $CO_2$, the adsorbent employed being activated charcoal and the production gas having a content of at least about 95% $CO_2$.

* * * * *